United States Patent [19]

Higuchi et al.

[11] 4,242,075

[45] Dec. 30, 1980

[54] EXTRUSION DIES FOR EXTRUDING HONEYCOMB STRUCTURAL BODIES

[75] Inventors: Noboru Higuchi, Nagoya; Shoji Futamura, Kawasaki, both of Japan

[73] Assignees: NGK Insulators, Ltd.; Institute of Technology Precision Electrical Discharge Works, both of Japan

[21] Appl. No.: 900,168

[22] Filed: Apr. 26, 1978

[30] Foreign Application Priority Data

May 4, 1977 [JP] Japan .................................. 52/51791

[51] Int. Cl.[3] ................................................ A01J 21/00

[52] U.S. Cl. ................................ 425/462; 264/177 R; 264/209; 425/463; 425/464

[58] Field of Search ...................... 425/462, 464, 382.2, 425/463; 264/177 F, 177 R, 171, 209

[56] References Cited

U.S. PATENT DOCUMENTS

| | | | |
|---|---|---|---|
| 1,874,503 | 8/1932 | Greenwood | 264/177 F |
| 3,156,085 | 11/1964 | Jamieson | 264/177 F |
| 3,406,230 | 10/1968 | Baxter et al. | 264/177 R |
| 3,605,649 | 9/1971 | Bundus | 264/177 R |
| 3,608,148 | 9/1971 | Sluijters | 264/171 |
| 3,824,196 | 7/1974 | Benbow et al. | 252/455 R |
| 3,916,611 | 11/1975 | Matsui et al. | 264/171 |
| 3,919,384 | 11/1975 | Cantaloupe et al. | 264/177 R |
| 3,981,657 | 9/1976 | Orso et al. | 425/464 |
| 4,041,597 | 8/1977 | Folmar et al. | 425/464 |

FOREIGN PATENT DOCUMENTS

| | | | |
|---|---|---|---|
| 1050990 | 2/1959 | Fed. Rep. of Germany | 264/177 R |
| 2421277 | 11/1974 | Fed. Rep. of Germany | 264/177 F |
| 50-34351 | 4/1975 | Japan | 264/177 R |

*Primary Examiner*—Jay H. Woo

*Attorney, Agent, or Firm*—Stevens, Davis, Miller & Mosher

[57] ABSTRACT

Extrusion dies for extruding honeycomb structural bodies which comprise a plurality of cell blocks having a cross sectional shape conforming to cells of the honeycomb structural body, a spoke supporter, and spokes, one end of which is fixed to the cell blocks and another end of which is integrally secured to the spoke supporter, said adjacent cell blocks forming discharge slits conforming to the cross sectional shape of the honeycomb structure, and said spoke supporter being provided with a plurality of feed inlets having a larger diameter, which are perforated from one end surface of the spoke supporter toward the cell blocks and a plurality of openings having a smaller diameter, which are perforated from another end surface of the spoke supporter to the feed inlet and connect to the feed inlet.

3 Claims, 6 Drawing Figures

EXTRUSION DIES FOR EXTRUDING HONEYCOMB STRUCTURAL BODIES

The present invention relates to extrusion dies for extruding honeycomb structural bodies, particularly to extrusion dies for extruding honeycomb structural bodies in which a plurality of cell blocks having the cross sectional shape conforming to each cell of the honeycomb structural body are held by a spoke supporter having a plurality of feed inlets through spokes, said spoke supporter being provided with openings connecting to the above described feed inlets from an end surface toward the cell blocks of the spoke supporter and a reservoir for charging a material to be extruded formed by the end surface toward the cell blocks of the spoke supporter and an end surface toward the spoke supporter of the cell blocks.

Furthermore, the present invention relates to extrusion dies for extruding honeycomb structures, in which the mechanical strength of the spoke supporter is increased enough to prevent the undesirable bending of the die without increasing the extrusion resistance.

For a better understanding of the invention, reference is taken to the accompanying drawings, in which.

Figure 1:
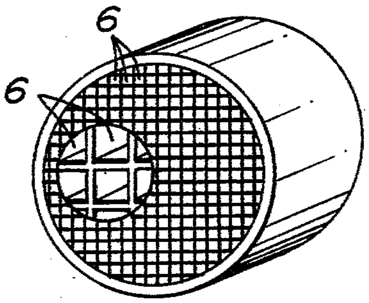
FIG. 1 is a perspective view for explaining the honeycomb structural body, a part of which is enlarged for explanation.

For example, the honeycomb body having the structure as shown in FIG. 1 and to be used for an apparatus for purifying exhaust gas from automobiles is shaped by using an extrusion apparatus. In general, this type extrusion apparatus is provided with a cylinder, a die connected to one end of the cylinder and an extruder, such as. screw, ram press and the like and a material for manufacturing the honeycomb structural body, for example, ceramic batch forcedly supplied to the above described die end surface by means of the above described extruding means to form the honeycomb structural body through the above described die.

Figure 2A:
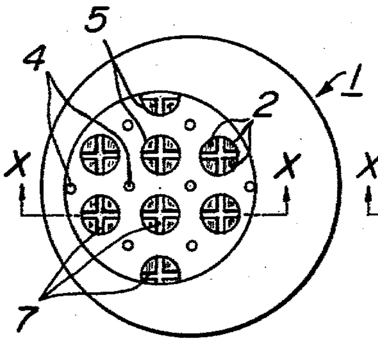
FIG. 2A is a partially enlarged plan view of an embodiment of conventional dies for extruding a honeycomb structural body as viewed from the cylinder side.
Figure 2B:
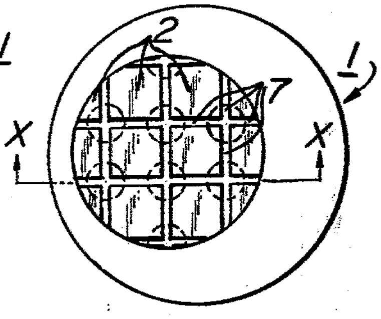
FIG. 2B is a partially enlarged plan view of said die as viewed from the extruding surface.
Figure 2C:
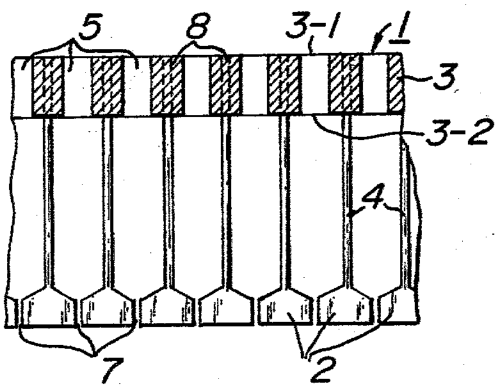
FIG. 2C is a cross sectional view taken along X—X line in FIGS. 2A and 2B.

FIGS. 2A–C show a conventional embodiment of the extrusion die for extruding the honeycomb structural body to be used for this type extrusion apparatus for manufacturing the honeycomb structural body. FIG. 2A, is a partially enlarged plan view of said die as viewed from the cylinder side, FIG. 2B shows a partially enlarged bottom view of said die as viewed from the reverse side and FIG. 2C shows a cross sectional view taken along X—X line of FIGS. 2A and 2B.

In FIGS. 2A–C, the numeral 1 is a die for extruding a honeycomb structural body, the numeral 2 is cell blocks having, for example, the cross sectional shape conforming to the unit cell 6 in the honeycomb structural body as shown in FIG. 1, the numeral 3 is a spoke supporter which fixedly secures spokes 4, the numeral 4 is the spokes, one end of which is fixed to the cell block 2 and another end of which is fitted in the spoke supporter 3, the numeral 5 is feed inlets and, for example, is circular and is provided opposite to an intersecting portion in discharge slits 7 which have, for example, the cross sectional shape conforming to that of the honeycomb structural body as shown in FIG. 1 and 8 shows apertures where the spokes 4 pass through.

The die for extruding the honeycomb structural body shown in FIGS. 2A–C is usually manufactured by treating as follows.

(1) A multiplicity of cell blocks 2, provided with the spoke 4 having a given length at one end thereof, are prepared. The apertures 8 through which spokes 4 are passed feed inlets 5 are located at the predetermined positions of the spoke supporter 3.

(2) Then, for example, the ends of the spokes are passed through the apertures 8 of the spoke supporter 3 and welded to fix the spokes to the spoke supporter 3.

However, in the manufacture of this type die for extruding the honeycomb structural body, there are the following problems. That is, when the above described step (2) is carried out, the worker must fix the spokes 4 to the spoke supporter 3 in such a way that the adjacent cell blocks 2 from the discharge slits 7 having the desired cross sectional shape. Therefore, the workability upon manufacture of the die considerably lowers and further it is difficult to obtain the discharge slits having the desired cross sectional shape. Moreover, it is necessary to provide the feed inlets 5 at the position opposite to the intersecting portion of the discharge slits 7 and the determination of the position is troublesome.

In addition, in the case of this type die, in order to increase the mechanical strength of the spoke supporter 3, the thickness of the spoke supporter 3 is made to be sufficiently large. However, it is impossible to make the opening area of the feed inlet 5 sufficiently large and further the extrusion resistance increases in proportion to the thickness of the spoke supporter 3, so that it is difficult to make the extrusion resistance satisfactorily small and maintain the desired mechanical strength.

An object of the present invention is to solve the above described problems and to provide an extrusion die in which the discharge slits having the desired cross sectional shape can easily be manufactured and the workability is satisfactorily improved.

Another object of the present invention is to provide an extrusion die wherein the spoke supporter can maintain the desired mechanical strength and further the extrusion resistance is permitted to be satisfactorily small.

The present invention will be explained with reference to FIGS. 3A–B hereinafter.

Figure 3A:
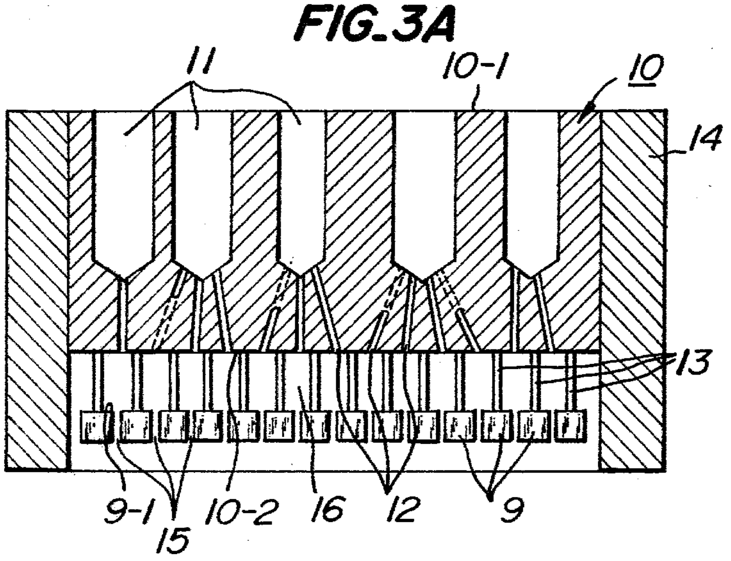
FIG. 3A is a vertical cross sectional view of an embodiment of the die of the present invention.
Figure 3B:
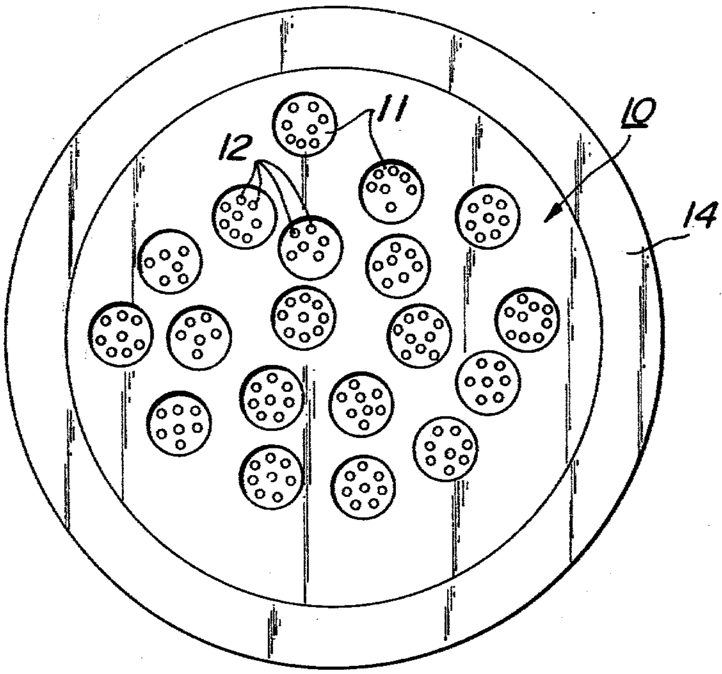
FIG. 3B is a plan view of said die as viewed from the cylinder side.

FIGS. 3A–B show an embodiment of the die for extruding the honeycomb structural body according to the present invention and FIG. 3A shows a vertical cross sectional view of said die and FIG. 3B shows a plan view of said die as viewed from the cylinder side.

In FIGS. 3A–B, the numeral 9 is cell blocks having a cross sectional shape of, for example, square, the numeral 10 is a spoke supporter wherein feed inlets 11 are perforated from one end surface 10-1 of the spoke supporter and openings 12 are perforated from another end surface 10-2, the numeral 11 is feed inlets having, for example, circular cross sectional shape, the numeral 12 is openings, one end of which connect to the feed inlets 11, the numeral 13 is spokes, one end of which is integrally secured to the spoke supporter 10 and another end of which is fixed to the cell block 9, the numeral 14 is an outer periphery portion of the die, the numeral 15 is discharge slit which is formed by the cell blocks 9 and has, for example, the cross sectional shape conforming to the cross sectional shape of the honeycomb structural body as shown in FIG. 1 and the numeral 16 shows a reservoir for charging the material to be extruded, which is formed by the end surface 10-2 of the spoke supporter 10, the end surfaces 9-1 of the cell blocks 9 and the inner wall of the outer periphery portion 14 of the die.

In FIGS. 3A–B, the feed inlets 11 are perforated at arbitrary positions on the end surface 10-1 of the spoke supporter 10. When the total cross sectional area of the feed inlets is referred to as $S_1$, the total cross sectional area of a plurality of openings 12 is referred to as $S_2$, the cross sectional area of the reservoir 16 is referred to as $S_3$ and the total cross sectional area of the discharge slits 15 is referred to as $S_4$, the feed inlets 11, the openings 12 and the reservoir 16 are formed so as to satisfy the following inequalities.

$$S_2 < S_3 \text{ and } S_3 > S_4$$

In this case, it is preferable to form these elements so as to simultaneously satisfy the following inequality.

$$S_1 > S_2$$

A die of an Example of the present invention is manufactured by the following steps.

(1) In the spoke supporter 10, the feed inlets 11 are perforated at arbitrary positions on one end surface 10-1 and the openings 12 are perforated at another end surface so as to reach to, for example, the bottom surface of the feed inlet 11. In this case, the openings 12 are perforated so as to not intersect with the position at the end surface 10-2 where the spoke 13 is provided.

(2) To the end surface 10-2 of the spoke supporter 10 provided with the openings 12, is integrally provided spokes 13 at the given position, for example, by electrical discharge machining. Alternately, the integral forming of the spokes may be effected prior to the perforation of the openings 12 at the above described step (1).

(3) A plate block where the cell blocks 9 will be formed at a later step, is fixed to the free end of all spokes 13. This fixing may be conducted by diffusion bonding by using, for example, copper, nickel and titanium as a solder.

(4) On the plate block is formed the discharge slits 15 having the predetermined cross sectional shape. This formation treatment is conducted, for example, by electrical discharge machining.

(5) An outer periphery portion 14 of the die is provided at the outer periphery of the spoke supporter 10.

In this manner, the die for extruding the honeycomb structural body as shown in FIGS. 3A—B is manufactured. When the extrusion is carried out by using the die of the above described Example, the material to be passes through the die in the following manner to form the honeycomb structural body.

(a) The material to be extruded, which is forcedly supplied into the feed inlets 11 is squeezed and flows into the openings 12. In this case, the total opening area of the openings has been made to be sufficiently smaller than the opening area of the feed inlet 11, so that the extrusion rate of the material to be extruded, which passes through respective openings 12 becomes substantially uniform.

(b) When said material reaches to the end surface 10-2 of the spoke supporter 10, said material flows into the reservoir 16 and is once reserved in the reservoir 16.

(c) When said material reaches to the end surface 9-1 of the cell blocks 9, said material is squeezed and flows into the discharge slits 15 and the honeycomb structural body having the desired cross sectional shape is formed.

In this manner, the material to be extruded, which is forcedly supplied to the feed inlets 11, is squeezed and flows into the openings 12 and then flows into the reservoir 16 and is once reserved therein and then squeezed and flows into the discharge slits 15, whereby the honeycomb structural body is formed. Accordingly, the extrusion rate at every portion of the honeycomb structural body extruded through the discharge slits 15 becomes uniform. That is, the honeycomb structural body having uniform mechanical strength can be obtained.

As mentioned above, according to the present invention, by providing the openings 12 in the spoke supporter 10 and further the reservoir 16 for the material to be extruded, it is possible to make the extrusion rate at every portion of the honeycomb structural body uniform after extruding and to form the sound honeycomb structural body. Furthermore, it is possible to accurately and easily form the discharge slits having the desired cross sectional shape and to perforate the feed inlets 11 at the arbitrary positions, so that the workability upon the manufacture of the die can be satisfactorily increased.

In addition, in the present invention, the feed inlets having a larger opening diameter than the conventional feed inlets 5 can be provided. Therefore, the extrusion resistance owing to the feed inlets 11 can be made so small as being substantially negligible and the extrusion resistance due to the spoke supporter 10 becomes substantially equal to the extrusion resistance due to the openings 12. In other words, the position where the spoke supporter 10 is subjected to the extrusion pressure, is limited to the region where the openings 12 are present. Accordingly, it is possible to sufficiently increase the mechanical strength of the spoke supporter 10 and further to make the extrusion resistance small.

Moreover, the present invention is not limited only to the extrusion of the honeycomb structural body having square cells as shown in FIG. 1 and the present invention also can be applied only by changing the shape of the cell blocks to the case when the honeycomb structural body having any cross sectional shape of cell, for example, regular triangle, regular hexagon, regular octagon, circle, etc. is extruded.

What is claimed is:

1. In extrusion dies for extruding honeycomb structural bodies which comprise a plurality of cell blocks having a cross sectional shape conforming to cells of the honeycomb structural body, a spoke supporter, and spokes, one end of each of said spokes being fixed to a respective cell block and the other end thereof being integrally secured to the spoke supporter, said cell blocks forming discharge slits conforming to the cross sectional shape of the honeycomb structural body, the improvement comprising, said spoke supporter is provided with a plurality of feed inlets extending from one end surface of the spoke supporter toward the spokes, each inlet having a terminus within said spoke supporter, a plurality of channels having a smaller diameter than said inlets extending from each said terminus to the end surface of the spoke supporter to which the spokes are secured.

2. Extrusion dies as claimed in claim 1, wherein a reservoir for charging a material to be extruded is formed by the end surface toward the cell blocks of the spoke supporter and the end surface toward the feed inlets of the cell blocks.

3. Extrusion dies as claimed in claim 1, wherein the feed inlets are perforated at arbitrary positions of the spoke supporter.

* * * * *